US012341349B2

(12) United States Patent
Müller et al.

(10) Patent No.: US 12,341,349 B2
(45) Date of Patent: Jun. 24, 2025

(54) CHARGING APPARATUS FOR VENDING-RELATED DEVICES, SYSTEM FOR CHARGING VENDING-RELATED DEVICES AND METHOD FOR CHARGING A VENDING-RELATED DEVICE USING SUCH A SYSTEM

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 0 days.

(21) Appl. No.: 17/740,629

(22) Filed: May 10, 2022

(65) Prior Publication Data

US 2023/0369891 A1  Nov. 16, 2023

(51) Int. Cl.
*H02J 50/00* (2016.01)
*H02J 50/80* (2016.01)

(52) U.S. Cl.
CPC ............ *H02J 50/005* (2020.01); *H02J 50/80* (2016.02)

(58) Field of Classification Search
CPC ................................ H02J 50/005; H02J 50/80
See application file for complete search history.

(56) References Cited

U.S. PATENT DOCUMENTS

| 5,544,784 | A * | 8/1996 | Malaspina | G07F 7/00 221/97 |
| 2012/0223595 | A1* | 9/2012 | Oodachi | H02J 50/402 307/104 |
| 2013/0335027 | A1* | 12/2013 | Xin | G07F 17/20 320/114 |
| 2016/0322852 | A1* | 11/2016 | Yeh | H04B 5/79 |
| 2018/0233801 | A1* | 8/2018 | Peralta | H04B 5/266 |
| 2021/0066975 | A1* | 3/2021 | Jakubowski | H02J 50/80 |
| 2021/0083523 | A1* | 3/2021 | Olgun | H02J 50/20 |
| 2021/0143681 | A1 | 5/2021 | Farkas | |
| 2021/0257856 | A1* | 8/2021 | Ng | H02J 7/0047 |

FOREIGN PATENT DOCUMENTS

WO    2017111755 A1    6/2017

OTHER PUBLICATIONS

International Application No. PCT/EP2023/062320, "International Search Report and Written Opinion", mailed Aug. 23, 2023, 12 pages.

* cited by examiner

*Primary Examiner* — Rexford N Barnie
*Assistant Examiner* — Joseph N Inge
(74) *Attorney, Agent, or Firm* — Kilpatrick Townsend & Stockton LLP

(57) ABSTRACT

A charging apparatus for vending-related devices is provided, comprising a charging compartment, which is adapted to house a plurality of vending-related devices in an unsorted manner; an inlet opening for inserting vending-related devices into the charging apparatus; and a wireless charging unit which is adapted to wirelessly transmit power to vending-related devices currently housed in the at least one charging compartment during charging operation. Furthermore, the invention relates to a system for charging vending-related devices, comprising such a charging apparatus and a vending-related device. Also, a method for charging the vending-related device of such a system is provided.

19 Claims, 1 Drawing Sheet

Figure 1:
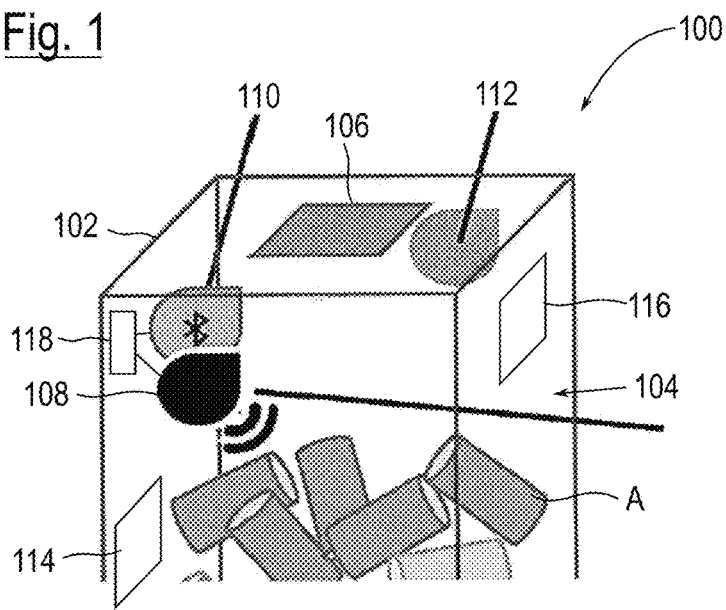

CHARGING APPARATUS FOR VENDING-RELATED DEVICES, SYSTEM FOR CHARGING VENDING-RELATED DEVICES AND METHOD FOR CHARGING A VENDING-RELATED DEVICE USING SUCH A SYSTEM

The present invention relates to a charging apparatus for vending-related devices, a system for charging vending-related devices and a method for charging a vending-related device using such a system.

Vending related devices in the sense of the present application relate to devices which may be attached or mounted to articles or goods to be sold in stores open to the public and may for example comprise electronic labels for dynamically displaying prices of the respective goods thereon as well as anti-theft devices which will be the main focus of the following examples given for explaining the present invention.

Such anti-theft devices are known in the art and have preferentially been used for many years in the field of stores open to the public, as they provide protection against unauthorized removal from the store or from a demarcated sales area within such stores, of an article or merchandise sold therein. For this purpose, appropriate detector units which are adapted to detect anti-theft devices in their proximity and/or to interact with them are usually provided at all entrances and exits of such stores or of any demarcated sales areas therein, and they are designed and intended to emit an acoustic and/or visual warning signal, if a customer attempts to remove any protected article or merchandise to which an anti-theft device of this kind is attached from the store or sales area without authorization, i.e. without paying for it beforehand. Thus after the article or merchandise has been bought by a customer, an anti-theft device attached thereto for protection has to be removed or disabled. This is usually either performed manually by a store clerk in a check-out area of the store or by means of a self-checkout system, in which the customer himself/herself can remove or deactivate the anti-theft device after checkout of the article, for example by means of a dedicated software application running on a smartphone.

While on the one hand, passive anti-theft devices are known, which do not require power to be supplied to them and may for example be embodied by RFID tags, which modulate an external electromagnetic field in a passive manner, for example emitted by the above-mentioned detector units, recently active or smart anti-theft devices have been introduced, which are adapted for an active communication with an external detector unit in their active state and may offer additional functionalities. For example, such smart anti-theft devices can be used to trace the article to which they are assigned and mounted over its entire shelf life and they also allow for more sophisticated anti-theft protection, for example by transmitting information about the article or self-status information.

However, since such smart or active anti-theft devices and also all other conceivable types of vending-related active devices have to be provided with an energy storage unit, such as a battery, it has to be taken care that they do not run out of power before the respective article is sold or they are removed from the article for other reasons.

In principle, such energy storage units may be either disposable or rechargeable, wherein disposable batteries may in turn be removable from the corresponding anti-theft devices, such that they can be replaced, or the entire device may have to be replaced once its battery is out of charge in case it is permanently installed therein. Thus, if disposable batteries are used as energy storage units of such devices, they have to be replaced once the stored energy is exhausted, which not only requires a monitoring of their lifetime but is also labor and cost intensive.

On the other hand, rechargeable energy storage units, such as secondary batteries, are usually preferred for ecological reasons, yet may be more expensive. Rechargeable batteries do not require exchanging either only the battery or the entire device once the energy stored in the energy storage unit is exhausted, yet the process of recharging them can also be cumbersome and labor-intensive.

It is known in the prior art to use charging stations for this purpose, in which a large number of rechargeable batteries or devices provided with said rechargeable batteries, such as in the present case vending-related devices, can be mounted in defined positions in order to connect them to an external power supply and recharge them. However, this process requires a human operator to manually insert the devices or their batteries in such charging modules and to selectively remove them once they have been recharged. This process thus requires a human operator to selectively handle each of the devices to be recharged.

It has also been proposed to recharge the energy storage units of vending-related devices while they are positioned on store shelves by means of long-range charging techniques. However, the power which can be transmitted by means of said long-range charging devices is very limited, and their installation is currently prohibitively expensive.

It is therefore an object of the present invention to provide a charging apparatus for vending-related devices, a system for charging vending-related devices and a method for charging vending-related devices which are efficient to use and relatively cheap to install and operate.

For this purpose, a charging apparatus for vending-related devices is proposed, comprising a charging compartment, which is adapted to house a plurality of vending-related devices in an unsorted manner, an inlet opening for inserting vending-related devices into the charging apparatus, and a wireless charging unit which is adapted to wireless transmit power to vending-related devices currently housed in the at least one charging compartment during charging operation. By providing the charging compartment in such a manner that the vending-related devices to be charged do not have to be arranged in predetermined positions or connected to suitable connectors for recharging them, a human operator merely has to insert the vending-related devices to be recharged through the inlet opening into the vending-related device in such a manner that they end up in the charging compartment where they can be wirelessly charged by the wireless charging unit.

In the most basic conceivable embodiment, the charging compartment may thus be formed by a hollow receptacle which is accessible through the inlet opening and into which the vending-related devices to be charged may simply be dropped such that they pile up in an unsorted or chaotic manner. Thus, different types and shapes of vending-related devices may easily be charged in the same charging apparatus without having to be handled differently.

In principle, several techniques may be used for charging the vending-related devices and corresponding types of wireless charging units may be employed in the charging apparatus according to the present invention. For example, the Qi technology often used to wireless charge smartphones with an inductive energy transmission might be used, this technology, however, has the drawback that the receiver coil in the vending-related device and the transmission coil of the charging unit have to be fairly close to one another and in a predetermined spatial relationship to one another. Since in the present invention in the charging compartment the vending-related devices are present in an unsorted manner, there might be cases where one or more of the vending-related devices do not get charged in the intended manner, since their distance to the charging unit is too high or their spatial relationship is not suitable.

Also, NFC charging technology might be used, however, similar problems as discussed above in the context of Qi technology might occur and NFC charging also only provides for very small charging currents such that a full recharge of vending-related devices might take an unacceptably long time.

Thus, it is preferred that in the charging apparatus according to the present invention, the wireless charging unit is adapted to emit electromagnetic or sonic waves during charging operation, in particular in the ultra-high frequency or visible electromagnetic spectrum or the ultra-sound spectrum. Such charging technologies have been proposed and developed by several manufacturers and respective charging units are available for example from Ossia Inc., uBeam or Energous Corporation. Typically, systems employing said techniques consist of a wireless charging unit and wireless charging receivers mounted on chips, which can be integrated in respective devices to charge their energy storage units, in the present case vending-related devices.

Taking into account the above-discussed available charging technologies and the dimensions of charging apparatuses usable in stores, so-called mid-field charging techniques may be employed, in which the distance between the charging compartment and thus the vending-related devices to be charged therein and the wireless charging unit may be below 1 m. The above-discussed charging technologies also have the advantage that the receivers to be installed in the respective vending-related devices are very small and can easily be integrated in vending-related devices.

While it is generally possible to charge all vending-related devices present in the charging compartment subsequently one at a time, in order to increase efficiency of the charging apparatus according to the present invention, the wireless charging unit may however also be capable of concurrently transmitting power to a plurality of vending-related devices.

While it might also be conceivable in certain embodiments of the present invention to carry out the charging apparatus in such a manner that it is possible to remove the recharged vending-related devices from the charging apparatus through the inlet opening after the charging operation has been completed, it may be advantageous to construct the inlet opening in such a manner that it is impossible for a human operator to reach into it, while in such a case the charging apparatus may further comprise an outlet opening which is adapted to permit removing the vending-related devices from the charging compartment.

Furthermore, the charging apparatus may also comprise a display unit, which is adapted to display information on the vending-related devices currently housed in the charging compartment. Such information may include the number of devices currently present in the charging compartment as well as individual information on the respective devices and/or summary information or historical charging data. For this purpose, one or more sensor units and/or means for communication between the charging apparatus and the vending-related device may be provided in order to retrieve the data to be processed and displayed on the display unit.

In some embodiments, the charging apparatus according to the present invention may further comprise a second compartment and a sorting unit positioned between the inlet opening and the two compartments, wherein the sorting unit is adapted to selectively transfer vending-related devices into either the charging compartment or the second compartment. In such embodiments, the second compartment may for example not be provided with a charging unit, and the sorting unit may be adapted to sort the vending-related devices inserted into the inlet opening based on information retrieved by suitable sensor units or communicated to the charging apparatus from the respective devices by means of a communications link. Embodiments with more than two compartments are also possible, in such cases, the sorting unit may selectively transfer the vending-related devices into one of the plurality of compartments in the above-described manner.

For example, the respective vending-related devices may communicate to the charging apparatus the number of charging cycles they have undergone, such that it can be decided whether a device in question has reached the end of its life cycle and shall be transferred into a compartment from which it can selectively be discarded. Another example may be that the vending-related devices communicate their remaining state of charge and may be transferred to the second compartment without a charging unit in case said state of charge is above a certain predetermined threshold, such that it does not have to be recharged and can therefore immediately be removed from the second compartment for further use in a new use cycle.

Furthermore, the charging apparatus according to the present invention may comprise an outer housing which is at least partially made from a conductive material in order to form a Faraday shield. Such embodiments are especially beneficial in case a plurality of charging apparatuses are positioned close to one another, for example in a checkout area of a store, and cross-talk between the apparatuses is to be avoided. Also, it can thus be ensured that the vending-related devices present inside the charging apparatuses cannot communicate to their outside such that they cannot be located or communicated with. Hence, even in cases a vending-related device should still be in an active state when it is inserted into the charging apparatus, it cannot trigger an alarm by communicating with an outside alarm system.

The present invention also relates to a system for charging vending-related devices comprising such a charging apparatus and at least one vending-related device comprising an energy storage unit, a wireless power receiver and at least one active component, wherein the wireless power receiver is adapted to receive power from the external wireless charging unit for charging the energy storage unit during charging operation of the vending-related device, and wherein energy is supplied from the energy storage unit to the at least one active component during operation of the vending-related device. In such embodiments, the at least one active component may be for example be a communications unit, such as a Bluetooth and in particular Bluetooth Low Energy transmitter, which is capable of communicating with outside entities, such as an alarm system as mentioned above and/or a communications unit of the charging apparatus. Also, the operation of the vending-related device refers to an active state thereof, in which different techniques for theft prevention may be employed, such as a communication with detector units positioned at exits of a store area, or other tasks may be performed by the device, depending on its type and intended use case.

While the wireless charging unit of the charging apparatus and the wireless power receiver of the vending-related device have to be adapted to be capable of transmitting and receiving energy according to a certain pre-defined standard, no further restrictions have to be made with regard to the shape and working principle of the vending-related device in its operation. In particular, different types and/or shapes of vending-related devices may be used together with a single charging apparatus, as long as they are all compatible to be charged by the wireless charging unit thereof.

While it is in principle possible to control the charging operation of individual vending-related devices by means of a control unit provided in the charging apparatus, it is also possible that the at least one vending-related device further comprises a control unit, which is preferably adapted to control the charging operation of the respective energy storage unit, or that a plurality of vending-related devices are controlled all together using a non-central control unit, in particular in a mesh system.

Furthermore, the at least one vending-related device may comprise at least one sensor unit for determining at least one parameter representing the current status of the vending-related device. Such parameters may include the current state of charge of the energy storage unit of the vending-related device, the number of recharging cycles it has undergone and also temperature and/or acceleration data in order to monitor the vending-related device for abnormal operating conditions which might necessitate its replacement.

As already briefly mentioned above, the charging apparatus and the at least one vending-related device may each be provided with respective control units as well as means for communication for establishing a communication link between the control units. In this manner, information can be exchanged between the two entities and the charging operation can be coordinated based on the exchanged data.

For example, in some embodiments, the at least one vending-related device may comprise a means for detecting the current state of charge of the energy storage unit and the system may be adapted to initiate, adjust or end the charging operation of the vending-related device based on the detected current state of charge of the energy storage unit. In this way, it can be ensured that no overcharging of the energy storage unit will occur, which might reduce the lifetime of the energy storage unit of the vending-related device or may even lead to overheating and damage to the device.

Furthermore, the charging apparatus may comprise means for communication with an external monitoring system for transmitting and/or receiving information on vending-related devices currently housed in the charging compartment to and/or from an external database hosted at the external monitoring system. In such embodiments, it is possible to keep track of individual vending-related devices over their entire lifetime and supplemental information in addition to information communicated by the vending-related devices themselves may be transmitted to the charging apparatus. In alternative embodiments, such database and track-keeping functionalities may also be implemented directly at the charging apparatus, for which it has to be provided with suitable processing and data storage means.

While the layout and shape of the charging apparatus can widely vary and can be adapted to different usage scenarios, the corresponding shapes of the inlet opening of the charging apparatus and the at least one vending-related device may be matched. In such embodiments, mishandling of the vending-related devices and the charging apparatus can be avoided.

Furthermore, the present invention relates to a method for charging a vending-related device using a system as just presented, wherein the method comprises the steps of inserting the vending-related device to be charged into the charging compartment of the charging apparatus, and activating the wireless charging unit for the charging operation. While it is in principle possible to manually start the charging operation once a vending-related device is inserted into the charging apparatus, said activation may also automatically be triggered, for example once a dedicated sensor senses the presence of at least one vending-related device inside the charging compartment and/or a vending-related device to be charged communicates with the charging apparatus by means of a communications link.

Also, a communications link may be established between the vending-related device and the charging apparatus for exchanging information on a current status of the device, which may again include the current state of charge of the energy storage unit thereof and/or other parameters such as the number of recharging cycles it has undergone.

Furthermore, the method according to the present invention may comprise prior to inserting the vending-related device into the charging compartment of the charging apparatus, a removing of the vending-related device from an article to be protected from theft or provided with the vending-related device for another reason such as dynamic labelling.

Similarly, the method may comprise, after completion of the charging operation, a removing of the vending-related device from the charging compartment of the charging apparatus and mounting it to an article, for example to be protected from theft or dynamically labelled. Thus, a full cycle of mounting the vending-related device to an article, removing it from the article once it is sold to a customer, and inserting it into the charging apparatus for a recharge may be established in an efficient manner in a store. For this purpose, the charging apparatus may beneficially be positioned close to a checkout area of said store.

Lastly and in order to protect the energy storage unit from overcharging which might reduce its lifetime or even damage it, the charging operation of the corresponding vending-related device may be carried out while its state of charge is below 80%. Furthermore, in some embodiments, a prioritized charging operation could be performed for anti-theft devices with a state of charge of below 20%.

Figure 2:
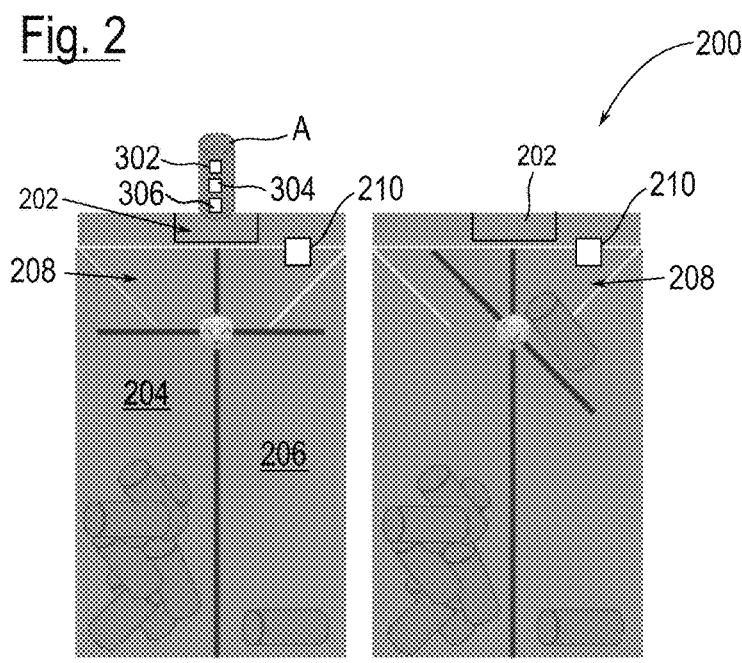
Figure 3:
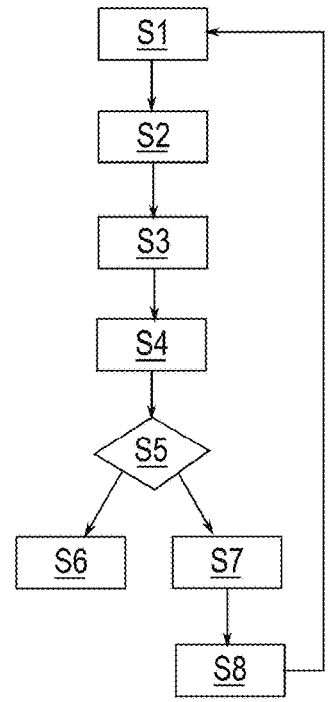

Further features and advantages of the present invention will become even clearer from the following description of embodiments thereof when considered together with the accompanying drawings. Said drawings show in particular:

FIG. 1 a first embodiment of a charging apparatus according to the present invention in a schematic view;

FIG. 2 a second embodiment of a charging apparatus according to the present in two different operational states in a schematic view; and FIG. 3 a flowchart of a method for charging and handling an anti-theft device according to the present invention.

In FIG. 1, a charging apparatus for vending-related devices according to a first embodiment of the present invention is shown in a schematic view and generally denoted with reference numeral 100. It comprises a housing 102 in which a charging compartment 104 is defined. While in the following description of an exemplary embodiment, the use case of anti-theft devices is in particular discussed, it shall be understood that any kind of vending-related device is applicable herein, for example also electronic labels, etc.

On the upper side of the housing 102, an inlet opening 106 is provided in such a manner that a human operator may insert vending-related devices A into the charging compartment 104 by simply dropping them said charging compartment, where they will pile up in an unsorted or chaotic manner, as also shown in FIG. 1. Even though the vending-related devices A are only shown in an identical schematic manner, different types of vending-related devices A may be charged in the charging apparatus 100, wherein as shown in FIG. 2, each of the vending-related devices A comprises an energy storage unit 302, a wireless power receiver 304 for interacting with a wireless charging unit 108 of the charging apparatus 100 in order to charge the energy storage unit 302, and an active component 306, such as a Bluetooth Low Energy transmitter.

Accordingly, a number of vending-related devices A to be charged are currently present in the charging compartment 104 in an unsorted manner. For the purpose of charging the vending-related devices A housed within the charging compartment 104, the wireless charging unit 108 is provided, which is adapted and positioned to be able to concurrently transmit power to the plurality of vending-related devices A in a wireless manner.

In order to detect the vending-related devices A within the charging compartment 104, a communications unit such as a Bluetooth transmitter 110 is furthermore provided and operatively coupled to the wireless charging unit 108. By establishing a communications link between the Bluetooth transmitter 110 and respective Bluetooth units 306 of the vending-related devices A, information can be interchanged between the two entities, such as for example current states of charge of the individual vending-related devices A in order to adjust the charging operation thereof accordingly.

Furthermore, in the displayed embodiment, an additional sensor unit 112 is provided, which is adapted to detect an inserting of vending-related devices A into the charging compartment, such as for example a light barrier, and is operatively coupled to at least the control unit 118 mentioned below.

Also, in the lower region of the housing 102, an outlet opening 114 is provided through which recharged vending-related devices can be extracted from the charging compartment 104. By providing said outlet opening 114 in the bottom region of the housing 102, the vending-related devices can be removed from the charging compartment 104 roughly according to a first-in-first-out scheme. Also, reference shall be made to display unit 116, which is provided at an outer wall of the housing 102 and operatively connected to a control unit 118 of the charging apparatus, which is in turn operatively connected to the communications unit 110 as well as the wireless charging unit 108 and the sensor unit 112. On the display unit 116, information regarding the vending-related devices A currently present in the charging compartment 104 can be displayed, such as the total number of vending-related devices A currently present therein or individual information of the respective vending-related devices A.

The control unit 118 is adapted to gather and process information in order to control the charging operation carried out by the charging unit 108 and may furthermore communicate with an external server unit in order to exchange information about the vending-related devices currently present in the charging compartment 104.

FIG. 2 shows a second embodiment of a charging apparatus according to the present invention in a schematic view, which is generally denoted by reference numeral 200 and comprises an inlet opening 202 as well as a charging compartment 204 similar to the charging compartment 104 of the embodiment shown in FIG. 1, as well as a second compartment 206, which is not provided with a wireless charging unit. For further description of the functionality provided in the charging compartment 204 of the charging apparatus 200 of FIG. 2, it is referred to the above description of the first embodiment, wherein all further components such as a communications unit, an outlet opening and a display unit may also be provided to the charging compartment 204 in a similar manner as shown in FIG. 1 for the charging compartment 104.

In contrast to the embodiment shown in FIG. 1, however, in the charging apparatus 200 of FIG. 2, vending-related devices A inserted through the inlet opening 202 are not directly inserted into the charging compartment 204 but rather are first entering a sorting unit 208, which is positioned between the inlet opening 202 and the compartments 204 and 206, as is shown on the left side in FIG. 2. Said sorting unit 208 is adapted to selectively transfer the vending-related device A in either the charging compartment 204 or the second compartment 206.

For this purpose, a communications unit 210 establishes a communication link with any newly inserted vending-related device A and based on information exchanged between the two entities, it is decided whether the sorting unit transfers the respective vending-related device A to the charging compartment 204 or the second compartment 206, in which no charging operation will be performed.

If, for example, the transmitted information shows that the state of charge of the vending-related device A is above a certain threshold such that no recharging is currently necessary for the vending-related device A or if the vending-related device A has already undergone a predetermined number of recharging cycles, such that it should be replaced, the sorting unit 208 will decide to transfer the respective vending-related device A into the second compartment, as is shown on the right side in FIG. 2. On the other hand, if it is found that the vending-related device A has a state of charge in a certain predetermined range and no other reason for discarding it is detected, the sorting unit 208 will transfer it into the charging compartment 204 to undergo a charging operation.

It shall at this point be mentioned that the techniques concerning the sorting of devices discussed in the context of FIG. 2 might also be used independently from charging said devices for predictive maintenance. In such a use case, the wireless charging unit of the charging apparatus could be disposed of and sorting the devices into at least two compartments based on information transferred via the communications unit could be performed as a standalone maintenance task.

FIG. 3 now shows a flowchart of the method for charging and using a vending-related device A in a practical application. First, in step S1, the vending-related device A is mounted to an article to be protected from theft which in step S2 is then placed on a shelf for display such that customers of the respective store are able to buy it. For this purpose, the respective customer will take the article to a check-out area of the store in which the method is performed, where in step S3, the vending-related device A will be removed from the article by a human operator such that the customer can carry the newly bought article out of the store.

Subsequently, in step S4, the human operator will insert the vending-related device into the inlet opening of the charging apparatus and in case a charging apparatus according to FIG. 2 is used, in step S5 it will be decided by the sorting unit 208 based on data provided by the communications unit 210 whether the vending-related device A should be transferred to the charging compartment 204 or the second compartment 206.

In case the vending-related device in question is transferred to the second compartment in step S6, it will remain there until it is removed by a human operator.

In case the vending-related device A is transferred to the charging compartment 204 in step S7, which would always be the case in the embodiment shown in FIG. 1, the respective wireless charging unit 108 will begin charging operation thereof, which may be completed once a predetermined state of charge of the energy storage unit of the vending-related device A is reached. Afterwards, in step S8, the vending-related device can be removed from the charging compartment by a human operator and the process can return back to step S1 in which the vending-related device A is again mounted to an article to be protected from theft, such that the cycle begins anew.

The invention claimed is:

1. Charging apparatus for vending-related devices, comprising:
   a charging compartment, which is adapted to house a plurality of vending-related devices in an unsorted manner;
   an inlet opening for receiving vending-related devices into the charging apparatus;
   a wireless charging unit which is adapted to wirelessly transmit power to vending-related devices currently housed in the charging compartment during a charging operation;
   a second compartment;
   a sorting unit positioned between the inlet opening and the charging compartment and between the inlet opening and the second compartment; and
   a communications unit configured to be in communication with the vending-related devices and with the sorting unit, wherein the communications unit is configured to:
      receive state of charge information with respect to a state of charge of the vending-related devices; and
      provide the state of charge information to the sorting unit,
   wherein, depending upon the state of charge information, the sorting unit is adapted to:
      transfer vending-related devices to the charging compartment when at least the state of charge is below a threshold; and
      transfer vending-related devices to the second compartment when at least one of (i) the state of charge of the vending-related devices is above the threshold indicating no recharging is currently necessary or (ii) the vending-related devices have already undergone a predetermined number of recharging cycles.

2. Charging apparatus according to claim 1, wherein the wireless charging unit is adapted to emit electromagnetic or sonic waves during the charging operation, wherein the electromagnetic or sonic waves are an ultra-high frequency or a visible electromagnetic spectrum or an ultrasound spectrum.

3. Charging apparatus according to claim 1, wherein a distance between the charging compartment and the wireless charging unit is below 1 m.

4. Charging apparatus according to claim 1, wherein the wireless charging unit is capable of concurrently transmitting power to a plurality of vending-related devices.

5. Charging apparatus according to claim 1, further comprising an outlet opening which is adapted to permit removing the vending-related devices from the charging compartment.

6. Charging apparatus according to claim 1, further comprising a display unit, which is adapted to display information on the vending-related devices currently housed in the charging compartment.

7. Charging apparatus according to claim 1, further comprising an outer housing which is at least partially made from a conductive material to form a Faraday shield.

8. System for charging anti-theft devices, comprising:
   a charging apparatus according to claim 1; and
   at least one vending-related device comprising:
      an energy storage unit,
      a wireless power receiver, and
      at least one active component,
   wherein the wireless power receiver is adapted to receive power from the wireless charging unit for charging the energy storage unit during charging operation of the vending-related device, and
   wherein energy is supplied from the energy storage unit to the at least one active component during operation of the vending-related device.

9. System according to claim 8, wherein the at least one vending-related device further comprises a control unit, which is adapted to control the charging operation of the energy storage unit.

10. System according to claim 8, wherein the at least one vending-related device comprises at least one sensor unit for determining at least one parameter representing a current status of the vending-related device.

11. System according to claim 8, wherein the charging apparatus and the at least one vending-related device are each provided with respective control units as well as means for communication for establishing a communication link between the control units.

12. System according to claim 8, wherein the at least one vending-related device comprises a means for detecting a current state-of-charge of the energy storage unit, and
   wherein the system is adapted to adjust the charging operation of the vending-related device based on the detected current state-of-charge of the energy storage unit.

13. System according to claim 8, wherein the charging apparatus further comprises means for communication with an external monitoring system for transmitting information, receiving information, or a combination of transmitting and receiving information on vending-related devices currently housed in the charging compartment to and/or from an external database hosted at the external monitoring system.

14. System according to claim 8, wherein shapes of the inlet opening of the charging apparatus and the at least one vending-related device are matched.

15. Method for charging a vending-related device using a system according to claim 8, the method comprising the following steps:
   inserting the vending-related device to be charged into the charging compartment of the charging apparatus; and
   activating the wireless charging unit for the charging operation.

16. Method according to claim 15, wherein prior to the charging operation, a communication link is established between the vending-related device and the charging apparatus for exchanging information on a current status of the vending-related device.

17. Method according to claim 15, further comprising prior to inserting the vending-related device into the charging compartment of the charging apparatus, removing the vending-related device from an article to be protected from theft.

18. Method according to claim 15, further comprising after completion of the charging operation, removing the vending-related device from the charging compartment of the charging apparatus and mounting it to an article to be protected from theft.

19. Method according to claim 15, wherein the charging operation of a corresponding vending-related device is carried out while its state-of-charge is below 80%.

* * * * *